COUNTER MEMORY SYSTEM UTILIZING CARRIER STORAGE

Filed Dec. 3, 1956

INVENTORS
HEINE ANDRIES RODRIGUES DE MIRANDA
JOHANNES MEIJER CLUWEN
THEODORUS JOANNES TULP
BY Fred M. Vogel
AGENT United States Patent Office 3,038,084
Patented June 5, 1962

3,038,084
COUNTER MEMORY SYSTEM UTILIZING CARRIER STORAGE

Heine Andries Rodrigues de Miranda, Johannes Meyer Cluwen, and Theodorus Joannes Tulp, all of Eindhoven, Netherlands, assignors, by mesne assignments, to North American Philips Company, Inc., New York, N.Y., a corporation of Delaware Filed Dec. 3, 1956, Ser. No. 625,727
Claims priority, application Netherlands Dec. 7, 1955
10 Claims. (Cl. 307—88.5)

This invention relates to memory systems which comprise a plurality of electrical memory elements controlled by control pulses.

Known systems of this type utilize, for example, magnetic cores in which the polarity of the remanent magnetism is reversible by the action of a control pulse (clock-pulse) thus causing the production or nonproduction of a pulse in a "read-out" winding in response to an input (read-in) pulse which affects the initial condition of magnetization. For this purpose, crystal rectifiers have alternatively been employed in lieu of the magnetic cores, in which the presence or absence of free-charge carriers is used as a memory feature.

These known systems have the disadvantage that, although the control pulses supply energy for the change-over from one memory condition to the other, the read-out pulses invariably have an energy-storage or a current amplitude smaller than the "read-in" pulses. This often requires additional amplifier elements or transformers if the read-out pulse is to be used as a read-in pulse for a next memory element such as is the case, for example, in the shift registers and counting circuit arrangements of electric computers.

Alternatively, electrical trigger circuit arrangements are often used as memory elements, and may comprise, for example, electron-discharge tubes, point-contact transistors or junction transistors. In practice, however, point-contact transistors often prove to be insufficiently reliable for this purpose. The use of electron-discharge tubes has the disadvantage of a higher energy dissipation, and junction transistors have the disadvantage that the switching frequency is limited to a lower value than is achieved in the system according to the invention.

An object of the invention is to provide an improved and simplified memory circuit. Other objects are to provide a memory circuit which does not require a source of D.-C. operating potential, which is economical to operate, and which can function rapidly. Still other objects will be apparent.

The present invention utilizes a combination of transistors and rectifiers arranged alternately and functioning to store information temporarily. The transistors have emitter-collector circuits to which the control pulses are fed, and the production of an output pulse in response to the control pulse depends upon the presence or absence of an electrical free charge stored in the base-zone of the transistor and acting as a memory. This output pulse, if and when it occurs, is applied to a rectifier element which has the property of retaining an electrical charge and hence acts as a memory device. A control pulse is then applied to this rectifier and, depending on the condition of its memory charge, a pulse may be produced which is fed to the base of the next transistor, through a rectifier which has the same current-passing direction as the base and which permits the base to be at a floating potential, thus producing a free charge stored in the base-zone of this next transistor.

The invention is based on recognition of the fact that that a considerable storage of free charges in the base-zone of the transistors, and in the memory rectifier elements, can be achieved by means of comparatively little energy and current. This storage of freely movable electrons and holes persists in the transistor for a comparatively long time, say approximately 50 microseconds, and persists for a longer period of time if the rate of recombination of the pairs of electrons and holes is lower. When a control pulse is supplied to the collector of a transistor with such a free charge stored in the base-zone, the transistor becomes conductive, only a very small part of this conductivity being at the cost of the free charge in the base-zone, since the emitter of the transistor emits fresh free charges into the base-zone during this conductive condition. Consequently the amplitude of the "read-out" current pulse considerably exceeds that of the "read-in" current pulse by means of which the free charge in the base-zone was produced. In the rectifier memory element, on the other hand, the free charge substantially disappears due to the action of the control pulse. The permissible time between the control pulses is limited by the time of retention of the memory free charge. In a transistor the recombination time of the pairs of electrons and holes is, for example, 50 microseconds, which time is usually sufficient in practical high-speed systems. In order to employ these effects to the best advantage, the transistor base, particularly during the occurrence of the control pulse, should be at a floating potential and for this purpose an isolating rectifier is connected in series with the base.

In order that the invention may be readily carried into effect, a few embodiments thereof will now be described with reference to the accompanying drawing, in which.

Figure 1:
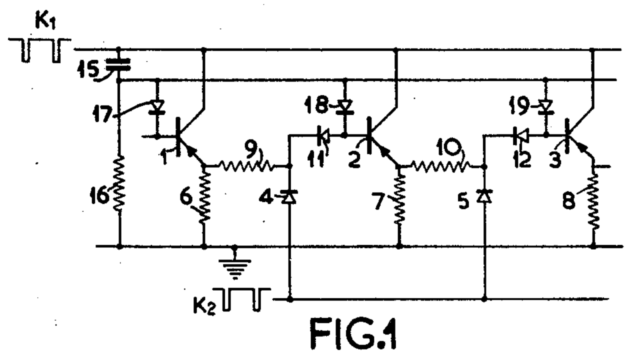
FIG. 1 is a schematic electrical diagram of a first embodiment of the invention for use in a shift register.

The shift register shown in FIG. 1 comprises, as memory elements thereof, a number of p-n-p type junction transistors 1, 2, 3 and so on, and a number of rectifiers 4, 5 and so on. The collectors of the transistors 1, 2, 3 are supplied with negative control pulses $K_1$, while negative control pulses $K_2$, which are produced at times other than the pulses $K_1$, are supplied to the rectifiers 4, 5. These control pulses, which sometimes are called "advance" or "shift" pulses, are supplied by generators preferably having a negligible internal resistance and synchronized to produce pulses out-of-phase. Alternatively, one pulse generator can be used to produce one set of pulses and the other set of pulses can be derived therefrom through a suitable delay line.

The source of operating direct voltage, as usually employed in transistor circuits, is dispensed with and is unnecessary in the circuit according to the invention.

The emitters of the transistors 1, 2, 3 are connected to electrical ground through resistors 6, 7, 8. They also are connected, through resistors 9, 10, to one terminal of the rectifiers 4, 5, respectively, to the other terminals of which the control pulses $K_2$ are supplied. The junction point of the resistor 9 and the rectifier 4 is connected through a rectifier 11 to the base of the transistor 2, and the junction point of the resistor 10 and the rectifier 5 is connected through a rectifier 12 to the base of the transistor 3, the pass-directions of the rectifiers 11 and 12 corresponding to those of the bases of the transistors 2 and 3, respectively.

The system operates as follows:

Assuming a free charge to exist in the base-zone of the transistor 1, which free charge can be produced, for example, by driving the base temporarily negative with respect to the emitter by means of a preceding transistor or by other pulsatory means, then a current will pass from the emitter to the collector upon the occurrence of the control impulse $K_1$. This current produces, across the emitter resistor 6, a voltage drop which causes a current pulse to flow via the resistor 9 through the rectifier 4. This rectifier 4 is of a type, for example, comprising a crystal of semi-conductive material, in which a free charge is produced and stored upon the passage of current therein. Thus, the aforesaid current pulse will cause a free charge to be produced in the rectifier 4. When the control pulse $K_2$ occurs, the polarity of which is opposite to the pass-direction of rectifier 4, this free charge will nevertheless bias the rectifier 4 so as to allow the passage of current, so that a pulse is passed via rectifier 11 through the base-collector path of the transistor 2 to electrical ground. Upon termination of the control pulse $K_2$ the rectifier 11 permits the base of the transistor 2 to store a free charge and thus to assume an arbitrary negative potential, so that it has a floating potential.

This free charge permits a current to pass through the collector-emitter path of the transistor 2 when the next control pulse $K_1$ appears, thereby producing a voltage drop across the resistor 7 and causing a current to pass through the rectifier 5, so that a free charge is produced in the rectifier 5. Therefore, this rectifier will pass current on the occurrence of the next control pulse $K_2$ and consequently cause the production of a free charge in the base of the transistor 3, and so on. The free charge stored in the transistors 1, 2, 3 and rectifiers 4, 5, respectively, which acts as a positive memory feature, is consequently passed on to the next memory element upon the occurrence of each control pulse, that is to say from the transistor 1 to the rectifier 4, hence to the transistor 2 and so on. If the transistor 1 had no free charge, this negative memory feature would likewise be passed on after each control pulse, that is to say that no free charge would be produced in the rectifier 4, or in the base-zone of the transistor 2, and so on.

The system may be used as a shift register. When either impressing or not impressing a free charge on the base of the transistor 1 by means of "read-in" pulses in successive cycles and according to a given code, this information will shift in succession to the next memory elements as a result of the occurrence of the control pulses. Alternatively, a free charge may simultaneously be impressed, according to a given code, on the bases of a number of the transistors, for example, by supplying a negative pulse to all of the bases concerned, the information thus recorded in the register advancing a memory element after each control pulse cycle.

The control pulses supplied to the successive stages must, of course, occur with a rapidity so as to make use of the memory charges which are temporarily stored in the transistors and in the memory rectifiers which comprise the stages of the shift register. The "read-out" pulses are preferably derived from the emitter of the last transistor.

It has been assumed above that the free charge of each transistor and rectifier disappears in the time interval between two control pulses supplied to a memory element. With respect to the transistors this means that this time interval should substantially correspond to said recombination time of the electron and hole pairs of the base-zone. Often, however, this free charge should be neutralized earlier. To accomplish this, positive-polarity erase pulses may be supplied via separating rectifiers to the bases of the transistors within said time intervals. This may be effected in a suitable manner by differentiating the edges of the control pulses $K_1$ by means of a differentiating network 15, 16, thereby obtaining positive-polarity pulses from the descending edges of the control pulses, which are fed to the transistor bases via rectifiers 17, 18 and 19 so as to neutralize said free charges in the transistors. With respect to the free charges of the rectifiers 4 and 5, the said objection of holdingover of the free charges is much less prevalent, since these free charges are substantially dissipated during the occurrences of the control pulses $K_2$.

Figure 2:
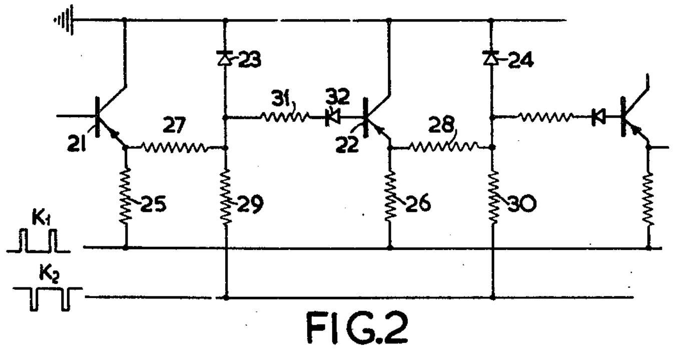
FIG. 2 is a schematic diagram of another embodiment of the invention.

The circuit arrangement shown in FIG. 2 comprises as memory elements a number of transistors 21, 22 and a number of rectifiers 23, 24. The collectors of the transistors 21 and 22 are connected to ground, and control pulses $K_1$ are supplied through separating resistors 25, 26 to the emitters of the transistors 21, 22. The rectifiers 23 and 24 are respectively connected in series with separating resistors 27 and 28 which are connected to the emitters of the transistors 21 and 22, respectively, and the remaining terminals of the rectifiers are grounded. The control pulses $K_2$ are supplied through separating resistors 29 and 30 to the junction points of the resistor 27—rectifier 23 and the resistor 28—rectifier 24, respectively. This first junction point is connected, through a separating resistor 31 and a rectifier 32, to the base of the transistor 22. The pass-direction of the rectifier 32 is the same as that of the base of the transistor 22. Preferably, the values of the resistors 29, 31 and the amplitude of control pulse $K_2$ considerably exceed that of the resistors 25, 27 and the control pulse $K_1$, respectively. Similarly, a resistor and a rectifier are connected in series between the junction of resistor 28 and rectifier 24, and the base of the following transistor.

The system operates as follows:

Assuming a free charge to exist in the base of the transistor 21, for example by driving this base temporarily negative with respect to its collector, then the transistor 21 will pass current when the control pulse $K_1$ occurs, so that the circuit comprising the resistor 27 and the rectifier 23 is substantially short-circuited. In this manner the rectifier 23 obtains a practically negligible free charge. When the control pulse $K_2$ occurs, the rectifier 23 will not pass any substantial amount of current, hence a considerable part of the current of the pulse $K_2$ passes through the resistor 31 and the rectifier 32 to the base of the transistor 22. Consequently, a free charge is produced in this base, and so on. If, contrary to the above, the transistor 21 initially lacked a free charge, then the current of the control pulse $K_1$ would pass through the resistor 27 and the rectifier 23, thus producing a free charge in the rectifier 23. During the occurrence of the control pulse $K_2$ this free charge will cause the current path through the resistor 31 and the rectifier 32 to be substantially short-circuited by the current passed by the rectifier 23, so that no free charge is produced in the base of the transistor 22. Thus, the input information, whether it be a pulse or a lack of a pulse, is passed on from stage to stage.

Figure 3:
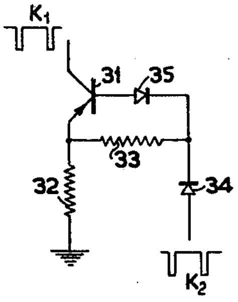
FIG. 3 is a schematic electrical diagram of a ring computer embodying the principle of the circuit illustrated in FIG. 1.

The circuit arrangements shown in FIGS. 1 and 2 may be transformed into a ring counter by coupling the output to the input. A very simple example of such a ring counter or trigger comprising only one transistor and one memory rectifier, is shown in FIG. 3. It comprises a transistor 31, the emitter of which is connected to electrical ground through a resistor 32, while the control pulse $K_1$ is supplied to the collector. The emitter of the transistor 31 is connected through a separating resistor 33 to one electrode of a rectifier 34 of a type adapted to produce a free charge therein. Clock pulses $K_2$ are supplied to the other electrode of the rectifier 34 with a polarity opposite to the pass-direction of the rectifier 34. A rectifier 35 is connected between the junction point of the resistor 33 and the rectifier 34 and the base of the transistor 31 with a polarity the same as this base.

The circuit operates as follows:

Assuming a free charge to exist at the base of the transistor 31, then during the occurrence of the control pulse $K_1$ a voltage drop will occur across the emitter resistor 32, which drop produced, via the resistor 33, a free charge in the rectifier 34. During occurrence of the control pulse $K_2$ the rectifier 34 will pass current which produces, via the separating rectifier 35, a free charge in the base of the transistor 31. Hence, the transistor 31 and the rectifier 34 alternately obtain a free charge. If they had no free charge initially, no current would flow during the occurrence of the control pulses, so that the circuit operation would be blocked.

In lieu of the junction transistors referred to above, for which transistors of opposite conductivity type may alternatively be substituted after reversal of the polarities of all the rectifiers and all the voltages, it is also possible to use transistors of the current-amplification type (collector-emitter current-amplification factor in excess of unity), the objections against point-contact transistors then being far less stringent than in conventional trigger circuits, since the current through them becomes zero after each control pulse. The advantage of utilizing current, amplifying transistors consists in the high switching sensitivity, since the floating base, as is known, effects a strong positive coupling and by its nature converts the transistor into a bistable trigger. If desired, photo-transistors may alternatively be employed, wherein the initial free charge may be produced by light impulses.

While the invention has been described by means of specific examples and in specific embodiments, we do not wish to be limited thereto, and obvious modifications will occur to those skilled in the art without departing from the spirit and scope of the invention.

What is claimed is:

1. A memory circuit comprising at least two stages, one of said stages including a transistor having an emitter, a collector, and a base which has the property of storing a free charge in response to current passed therein, an input terminal connected to said base, an output circuit including a first source of control pulses and means connected to apply said control pulses through the emitter-collector path of said transistor whereby an output signal is selectively produced in accordance with the presence or absence of said free charge stored in the base, said first source being the sole source of operating potential for said emitter-collector path, and an output terminal connected to said output circuit to receive said output signal, another of said stages including a rectifier element which has the property of storing a free charge in response to current passed therein, an input terminal connected to said rectifier element, an output terminal connected to said rectifier element, a second source of control pulses, and means connected to apply said last-named control pulses to said rectifier element whereby an output signal is selectively produced at said last-named output terminal in accordance with the presence or absence of said free charge stored in the rectifier element, and means connecting the output terminal of one of said stages to the input terminal of the other of said stages.

2. A memory circuit as claimed in claim 1, in which said second source of control pulses produces pulses at times between the occurrences of the pulses produced by said first source of control pulses.

3. A memory circuit as claimed in claim 1, including means for producing erase pulses and means connected to apply one of said erase pulses to said transistor base after the occurrence of each of said first control pulses thereby to neutralize any free charge of said base.

4. A memory circuit as claimed in claim 3, in which said means for producing erase pulses comprises a differentiating network connected to receive said first control pulses.

5. A memory circuit as claimed in claim 4, including a rectifier connected between said differentiating network and said base and polarized to pass the differentiated trailing edges of said first control pulses.

6. A memory circuit comprising a transistor having an emitter, a collector, and a base which has the property of storing a free charge in response to current passed therein, means for selectively causing a free charge to be stored in said base, a first resistor connected at an end thereof to said emitter, a first source of control pulses connected between said collector and the remaining end of said first resistor thereby to cause the selective production of an output signal at said emitter in accordance with the presence or absence of said free charge stored in said base, said first source being the sole source of operating potential for said collector, a rectifier element having the property of storing a free charge in response to current passed therein, a second resistor connected between said emiter and a terminal of said rectifier element, and a second source of control pulses connected to said rectifier element whereby said second control pulses are selectively passed through said rectifier element in accordance with the presence or absence of said free charge stored in said rectifier element.

7. A memory circuit comprising a memory rectifier element having the property of storing a free charge in response to current passed therein, means connected to selectively cause a free charge to be stored in said rectifier element, a first source of control pulses connected to said rectifier element whereby said control pulses are selectively passed through said rectifier element in accordance with the presence or absence of said free charge therein, thereby producing an output signal, a junction transistor having an emitter, a collector, and a base which has the property of storing a free charge in response to current passed therein, a rectifier connected between said memory rectifier element and said base and polarized the same as said base thereby permitting said base to receive said output signal and store a free charge in response thereto, a second source of control pulses, and means connected to apply said second control pulses through the emitter-collector path of said transistor, said second source being the sole source of operating potential for said emitter-collector path.

8. A memory circuit comprising a transistor having an emitter, a collector, and a base which has the property of storing a free charge in response to current passed therein, means for selectively causing a free charge to be stored in said base, a first resistor connected at an end thereof to said emitter, a first source of control pulses connected between said collector and the remaining end of said first resistor thereby to cause the selective production of an output signal at said emitter in accordance with the presence or absence of said free charge stored in said base, said first source being the sole source of operating potential for said collector, a rectifier element having the property of storing a free charge in response to current passed therein, a second resistor connected between said emitter and a terminal of said rectifier element, a third resistor connected at an end thereof to said rectifier terminal, and a second source of control pulses connected between the other terminal of said rectifier element and the other end of said third resistor.

9. A memory circuit comprising a memory rectifier element having the property of storing a free charge in response to current passed therein, means connected to selectively cause a free charge to be stored in said rectifier element, a first resistor connected at an end thereof to a first terminal of said rectifier element, a first source of control pulses connected between the remaining terminal of said rectifier element and the remaining end of said first resistor whereby said control pulses are selectively passed through said rectifier element in accordance with the presence or absence of said free charge therein, thereby producing an output signal, a transistor having an emitter, a collector, and a base which has the property of storing a free charge in response to current passed therein, a rectifier and a second resistor connected in series between said base and said first terminal of said memory rectifier element, said last-named rectifier being polarized the same as said base thereby permitting said base to receive said output signal and store a free charge in response thereto, a second source of control pulses, and means connected to apply said second control pulses through the emitter-collector path of said transistor, said second source being the sole source of operating potential for said emitter-collector path.

10. A memory circuit comprising a transistor having an emitter, a collector, and a base which has the property of storing a free charge in response to current passed therein, a first resistor connected at an end thereof to said emitter, a first source of control pulses connected between said collector and remaining end of said first resistor, said first source being the sole source of operating potential for said collector, a memory rectifier element having the property of storing a free charge in response to current passed therein, a second resistor connected between said emitter and a terminal of said memory rectifier element, a rectifier connected between said base and said terminal of the memory rectifier element and polarized in the same current-passing direction as said base, a second source of control pulses, and means connected to apply the control pulses of said second source to the remaining terminal of said memory rectifier element.

References Cited in the file of this patent

UNITED STATES PATENTS

| | | |
|---|---|---|
| 2,644,892 | Gehman | July 7, 1953 |
| 2,644,893 | Gehman | July 7, 1953 |
| 2,785,390 | Rajchman | Mar. 12, 1957 |
| 2,848,628 | Altschul | Aug. 19, 1958 |
| 2,866,178 | Lo et al. | Dec. 23, 1958 |
| 2,906,890 | Odell et al. | Sept. 29, 1959 |

OTHER REFERENCES

"Diode Amplifier," National Bureau of Standards Technical News Bulletin, vol. 38, No. 10, October 1954.